United States Patent [19]
Landerretche

[11] Patent Number: 5,568,797
[45] Date of Patent: Oct. 29, 1996

[54] POWER CONTROL ASSISTANCE DEVICE FOR MOTOR VEHICLES

[76] Inventor: Alain Landerretche, 109 rue du Bois Hardy, Nantes, France, 44100

[21] Appl. No.: 256,110
[22] PCT Filed: Dec. 18, 1992
[86] PCT No.: PCT/FR92/01208
 § 371 Date: Sep. 22, 1994
 § 102(e) Date: Sep. 22, 1994
[87] PCT Pub. No.: WO93/12949
 PCT Pub. Date: Jul. 8, 1993

[30] Foreign Application Priority Data

Dec. 26, 1991 [FR] France ................................ 91 16350

[51] Int. Cl.⁶ ........................................................ F02D 7/00
[52] U.S. Cl. .................................................... 123/396
[58] Field of Search ................................. 123/396, 399, 123/397; 73/118.1

[56] References Cited

U.S. PATENT DOCUMENTS

| | | | |
|---|---|---|---|
| 4,019,475 | 4/1977 | Nuss | 123/396 |
| 5,020,496 | 6/1991 | Huber et al. | 123/399 |
| 5,065,722 | 11/1991 | Huber et al. | 123/399 |
| 5,263,448 | 11/1993 | Bluhm et al. | 123/396 |

*Primary Examiner*—Raymond A. Nelli
*Attorney, Agent, or Firm*—Graham & James LLP

[57] ABSTRACT

A power control assistance device provided with an actuator mechanically connected to the power control member to provide a directly controlled returned force to the power control member in direct opposition to the force exerted by the operator.

17 Claims, 5 Drawing Sheets

FIG. 11 detail A

FIG. 12 detail A

POWER CONTROL ASSISTANCE DEVICE FOR MOTOR VEHICLES

BACKGROUND OF THE INVENTION

1. Field of the Invention

The present invention relates to a power control assistance device for motor vehicles having an internal combustion engine. It is particularly suitable for controlling the speed and traction slippage of highway vehicles, but this application of the invention is to be understood as one non-limitative example of its potential uses.

2. Discussion of Related Art

The comfort and power of highway motor vehicles as well as traffic conditions in today's world make compliance with speed limits problematical. The driver who wants to maintain his vehicle at the maximum speed authorized while not violating the regulations is forced to pay great attention to his speedometer. A device capable of effectively assisting him in this task would be of great interest.

Prior devices for this purpose are known, among which three different principles of operation can be distinguished:

cruise controls: they maintain the speed stable despite changes in the layout of the road.

excess-speed alarms: they signal the exceeding of the maximum speed by means of a luminous or acoustic alarm.

speed limiters: they prevent exceeding the maximum speed, generally by positioning a movable stop on the power control.

Apparatus based on these principles are little used, with the exception of cruise controls which the manufacturers offer as an option on high-class vehicles. French Patents 2 164 362, 2 537 742, 2 444 163, and 2 632 578 may be mentioned as representative examples.

These devices present problems which it is the object of the invention to solve, namely:

Cruise controls do not act as limiters and cannot be used in city traffic; they do not permit natural slowing down by release of the pedal and they are put out of operation by actuation of the brake or clutch;

Alarms do not participate in automating the driving and they do not assist in maintaining the speed within a narrow range.

Limiters have the drawback of keeping the speed of the vehicle in check, or of placing a hard point on the stroke of the pedal which the control means and the manner of action used make disagreeable for the driver and which is incompatible with the stabilizing of the speed.

SUMMARY OF THE INVENTION

The invention described below is the result of a different approach to the problem and it combines the functions of these three devices without having their limitations. It acts simultaneously, and by a single signaling, limiting and cruise-control means, and it can be used, whatever the traffic conditions are. It also leaves the driver a maximum freedom of choice and does not change his driving habits, while very effectively assisting him.

The solution consists in producing a control loop in which the driver is integrated as an active element. The device consists of at least a speed sensor, a set-speed selector, an electronic unit and an actuator. The speed of the vehicle is detected by a sensor and compared by the electronic unit with the set speed which has been selected. When the speed becomes greater than the speed set, the electronic unit controls the actuator, so as to produce a controlled return force on the power regulating member that is directly under the control of the driver, for example an accelerator pedal. This force, transmitted by a mechanical connection, is produced by a spring associated with a triangulation mechanism. A motor in the mechanism displaces the components of forces which act on the output member of the actuator. The return force on the pedal is thus regulated, without discontinuity, from a minimum value to a maximum value, regardless of its position, as a function of the control signal which the actuator receives from the electronic unit. Thus, the invention does not deprive the driver of control of his accelerator:

The measurement of the excess speed is made known to him by a direct perception which is related to his driving action; the return force on the spring is directly related to the speed difference. It is no longer necessary to observe the speedometer.

The variations in intensity of this force are sufficient to assist the driver in effortlessly and unconsciously correcting the position of the accelerator pedal.

The foot of the driver is thus used both as speed sensor and as intelligent actor in the driving; the control of the speed is transposed to the instinctive control of a force and the driver can limit or stabilize the speed without any effort of attention. The technical solutions employed also enable the driver to override the action of the device at any time.

The limiting of traction slippage is based on the same principles, using the measured speed of the wheels. It can be noted that the invention is not incompatible with other equipment (electronic injection, automatic transmissions, electronic gas valve, etc.) and that installing it requires only a minor adaptation. It is, by its very nature, very safe and does not require any other maneuver on the part of the driver than the selection of the maximum speed. The simplicity of the means used implies a very low cost of manufacture and great reliability.

The detailed explanation of the operation given in the following description makes it possible to note the scope and advantages of these principles, as well as the technical solutions employed.

DETAILED DESCRIPTION OF THE PREFERRED EMBODIMENTS

In the non-limitative example selected in order to illustrate the operation of the invention, the power control member which is directly under the control of the driver is the accelerator pedal. The power control is the throttle valve of an automobile. It could just as well be an injection pump or an electronic control device, in the same way as the principle would apply also to any other motorized device. Reference will first of all be had to FIG. 1.

Figure 1:
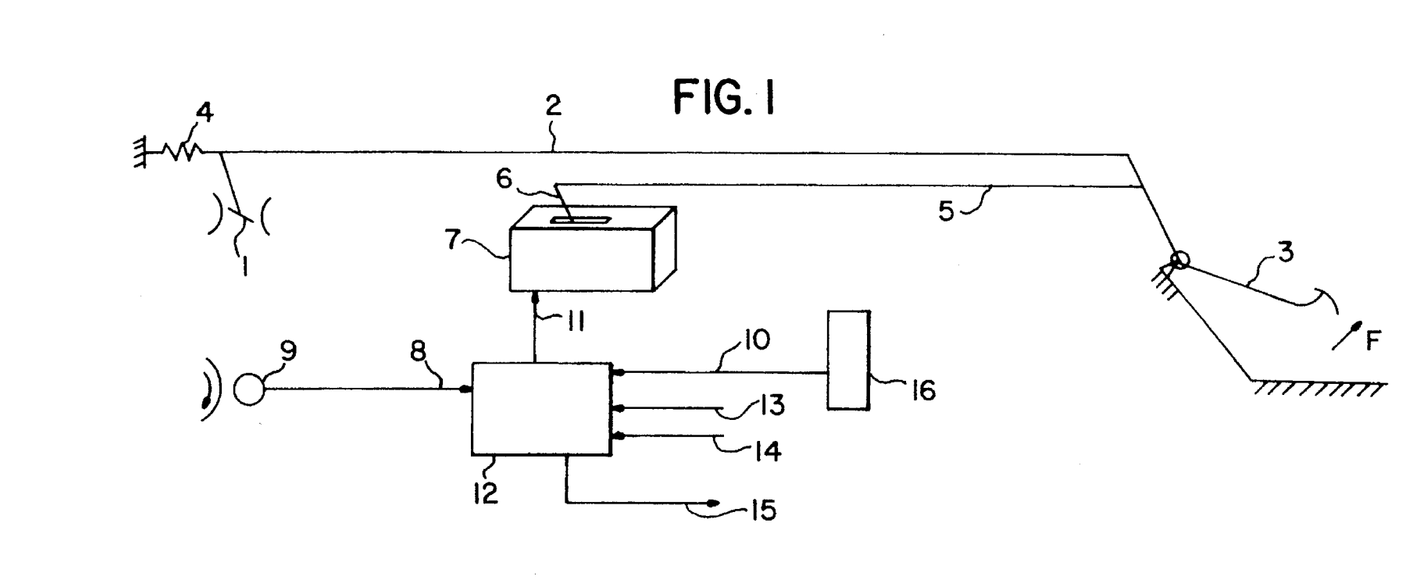
FIG. 1 is a general block diagram.
Figure 2:
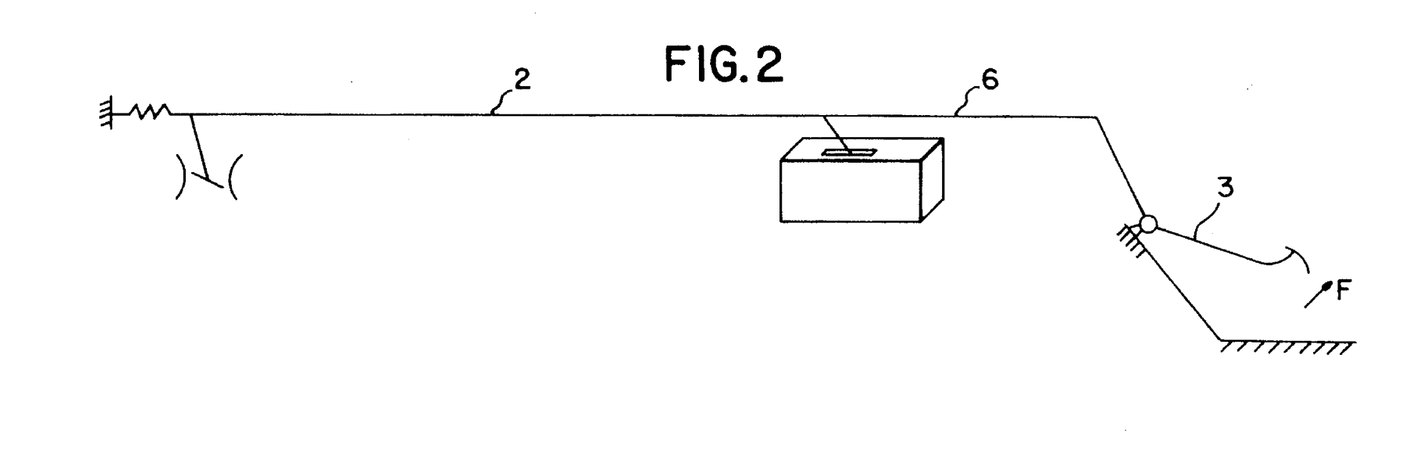
FIG. 2 shows a variant of the connection.

The throttle valve (1) is pulled by a cable (2) actuated by the pedal (3) against the force of the spring (4). A mechanical connection (5) which is firmly connected with the movements of the pedal also serves to displace the output member (6) of the actuator (7). As indicated in FIG. 2, the mechanical connection (5) can also be entirely or partly common to the actuator and the power control, in this case the throttle valve.

An electronic control unit (12) receives the speed measurement (8) from a sensor (9). Via the line (10) it also receives the set speed limit value established by the selector (16). This set speed can be selected from among predetermined values, or it can result from the storing of the instantaneous speed. It may also be imposed by an external device—remote guidance, safety marker, anti-collision system, etc.

The signal (11) formed by the electronic unit assures the control of the actuator (7) which is used as force control. When the speed of the vehicle exceeds the set speed, this signal controls the actuator in such a manner that it produces on the pedal (3), by means of the output member (6) and via the connection (5), a controlled return force which is opposite the force with which the driver acts.

The use of the actuator in force control is one of the essential characteristics of this invention which distinguishes it from the prior limiters or cruise controls in which the actuator is controlled in position. Here, the point of application of the force may, on the contrary, occupy any position whatsoever, since it is bound to the stroke of the pedal. Furthermore, the return force is controlled by the electronic unit so as to be a function of the speed difference. Its intensity and the progressive nature of its action are at all times determined by the automatic control, independently of the displacement of the pedal. The actuator can adjust this force without interruption of continuity from a value of zero to the maximum value of the operating range. It thus provides the driver with a quantified perception of the speed difference. The return force is sufficiently great to displace the foot of the driver, but it also brings about on his part a reflex reaction by which he instinctively maintains the vehicle at the preselected speed. The proportionality which exists between the speed difference and the force assures stable operation of the regulation. Despite everything, the driver can act with a greater force in order intentionally to temporarily exceed the speed limit. This exceptional position is indicated by an alarm placed in operation when the difference in speed is maintained at an excessive value. Furthermore, the return force is temporarily forced to a low value by the action of a signal controlled by the disengagement as well as when the speed of depression of the accelerator pedal, representative of intentional acceleration, exceeds a predetermined threshold. The speed of the pedal can be transmitted by a sensor integrated in the actuator or come from outside information. These solutions improve the comfort of driving and fully respect the freedom of action of the driver. Likewise, he can also travel at a lower speed, simply by letting up on the accelerator pedal; no maneuver is necessary for placing the system out of operation. As soon as the speed of the vehicle is less than the speed set, the electronic unit forms on the line (11) the signal which brings the actuator to a zero force. The apparatus is then no longer perceptible to the driver.

It is worthy of note that the invention at no time limits the power of the vehicle and therefore its ability to accelerate, and that its use does not require any particular attention or action on the part of the driver. Thus, the limiter cruise control is equally well adapted to city traffic or busy highways, where it does not modify the driving habits, as to long trips on a highway at stabilized speed.

These characteristics distinguish the invention from the limiters described in the prior patents, in which the control mechanism acts as a movable stop against the stroke of the pedal, even if such stop is resilient and can be exceeded by applying a greater force. In fact, the position of the stop is adjusted as a function of the speed difference, and the hardness which it opposes to the pedal therefore depends on the movements of the pedal, both in intensity and in progressive character. The feeling of a hard point is therefore no longer reproducible and at times sudden and without direct relationship to the speed difference.

The invention described here completely overcomes these disadvantages due to the fact that the intensity of the force and the progressive nature of its action are under all circumstances controlled by the automatic control. The action of the device, which is soft, progressive and in accord with the behavior of the vehicle, has the result that its use is never perceived as a restraint.

Another interesting feature is that, by construction, the force produced by the actuator is unidirectional. It can act only in the direction of return towards zero speed and in no case in the direction of acceleration, acceleration remaining strictly under the control of the driver, contrary to the arrangement adopted on cruise controls. The device is therefore intrinsically a positive safety device and does not require any additional artifice in order to overcome a malfunction.

The lines (13) and (14) can transmit safety signals to the electronic unit, for instance the "stop" alarm of automobiles and/or the measurement of excessive engine speed, without these examples being limitative. These signals act by way of priority to adjust the restoring force to the maximum, even when the limiter/cruise-control function is not in operation, which improves the information to the driver and safety.

The control of the traction slippage is effected in accordance with the same principles: The electronic unit detects the slippage by comparing the speed of rotation of the wheels and determines the correction signal. The different speed control, slippage, and safety signals are compared in a maximum selector. The one which implies the greatest return force determines the signal by which the line (11) acts on the control of the actuator, unless a disengagement action or an acceleration temporarily forces the control signal to a low value.

The electronic unit can also generate at least one electric output signal as a function of predefined criteria. As example, there may be mentioned the absolute limitation of the maximum speed of a truck or an ordinary transport vehicle by acting directly on the electronics of the injection system. Similarly, the control of the slippage can act on the automatic brake control or on the ignition of the vehicle simultaneously with the adjustment of the return force of the power control. These results are obtained without additional investment.

Figure 3:
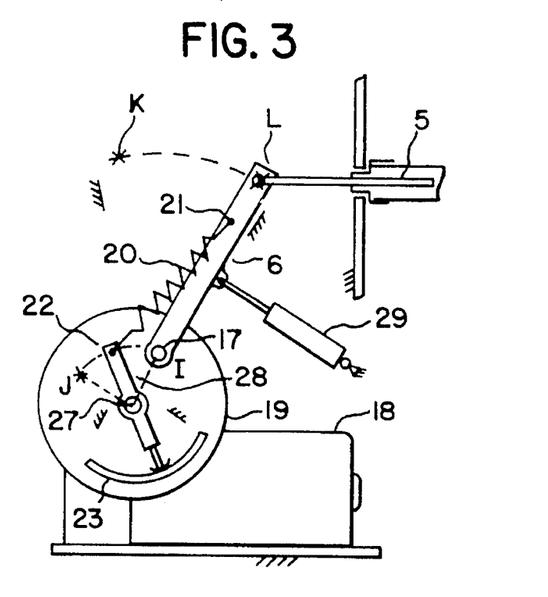
FIG. 3 shows the principle of operation of the actuator.

FIG. 3 shows a simplified embodiment of the actuator which makes it possible to understand its operation. It operates on the principle of an open loop force control, obtained by displacing the components of the forces which a spring exerts on the lever of the output movement. This effect is itself the result of the closed-loop control of the position of one of the anchoring points of the spring. It is formed of an electric motor (18) which is associated with a reduction gear (19) to form a geared motor of mechanically non-reversible movement. The output shaft (27) of the geared motor drives in rotation a rod (28) the end of which moves along the arc IJ. A copy system (23), a potentiometer or binary coder,for example, is integral with the movement of the rod and transmits to the electronic unit the information which permits the position control of said unit. The position can also be determined by counting the number of revolutions of the engine. The output member of the actuator which is in charge of transmitting the return force is the lever (6). It could also be a cable circular winding sector or any other pivoting mechanical part capable of transmitting the force. This lever pivots at one end on a pin (17) which is aligned with the point I and integral with the body of the actuator. It moves on a plane parallel to that of the rod. The other end of the lever is connected to the mechanical connection with the accelerator pedal; this connection can be effected by a sheathed flexible cable. This end moves along the arc KL corresponding to a proportional displacement of the pedal, K being the position of rest and L the position of maximum power. A spring (20) is fastened to two pivots by which it is tensioned with a large initial tensile force between the rod on the one hand, pivot (22) and the lever on the other hand, pivot (21). When the pivot (22) is aligned with the pin (17), the tensile force of the spring does not exert any component of rotation on the lever (6), whatever its position on the arc KL. There is therefore no return force on the pedal. In fact, a slight misalignment of the pivot (22), directed towards J, makes it possible to assure the tensile force which is just necessary in order to maintain the tension of the cable. Thus, the lever (6) accompanies the movements of the pedal without the driver feeling the effects thereof. It is this position which the electronic unit imposes upon the rod as long as the speed is less than or equal to the set speed. As soon as the speed becomes greater, the motor is controlled in such a manner that the rod moves from I towards J. The tensile force of the spring thereby produces a component of rotation on the lever (6). The position control of the rod, and therefore of the pivot (22) on the arc IJ, which is a function of the speed difference, also makes it possible to control the return force F which the driver feels. Zero in position I, the force is maximum in position J.

Figure 4:
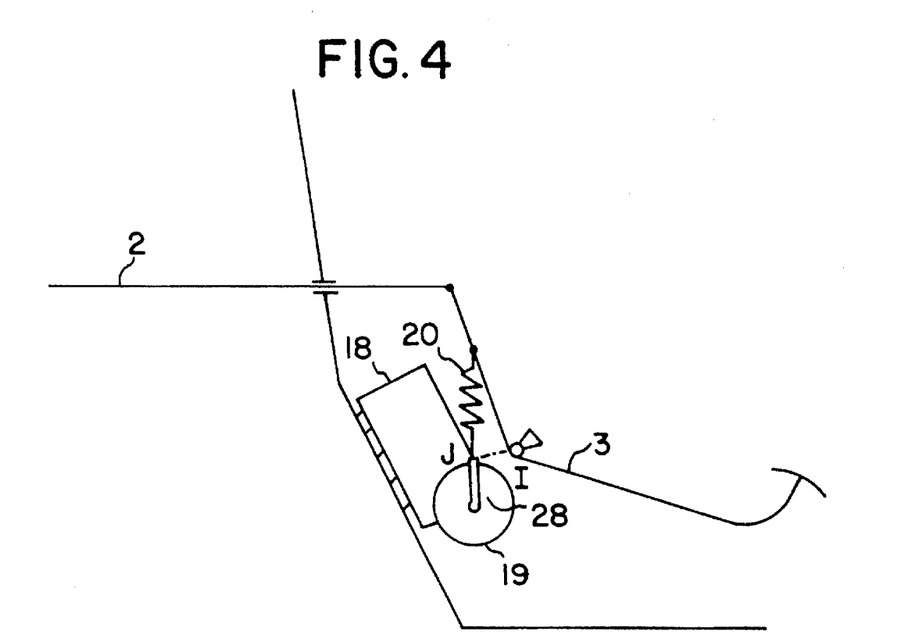
FIG. 4 shows the principle of an embodiment integrated in the pedal.
Figure 5:
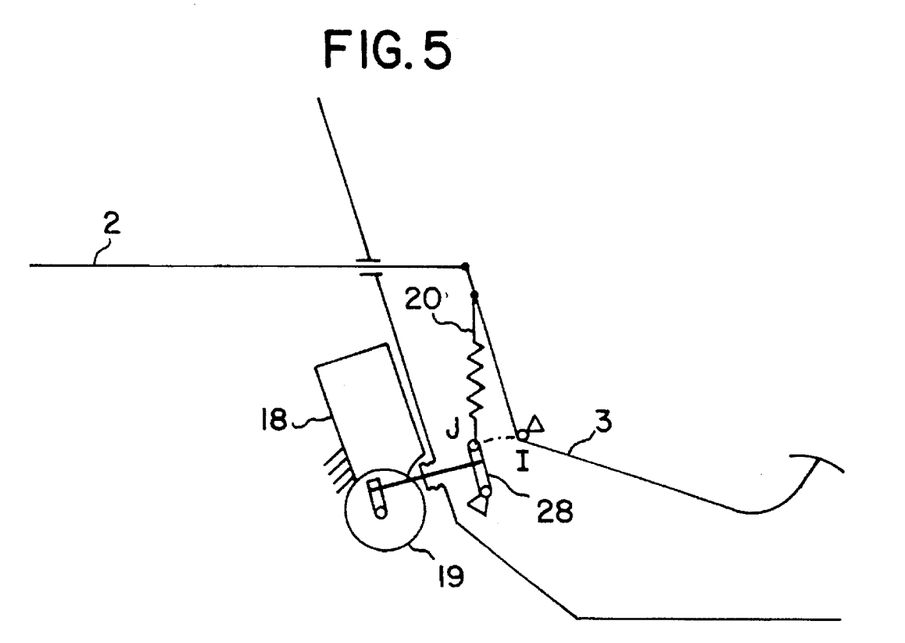
FIG. 5 shows a variant with pedal.

The force breakdown mechanism which is at the basis of the operation of the actuator can also advantageously be integrated in the accelerator pedal, as indicated in FIG. 4. In this case, the lever (6) is replaced by an arm of the pedal or by an element integral with its displacement, directly subject to the traction of the spring (20). The rod (28), which displaces the pivot (22) over the arc IJ, can be borne by the geared motor or articulated on an independent pin and driven by the geared motor by means of a mechanical coupling (FIG. 5) adapted to the constraints as to force and space.

Figure 6:
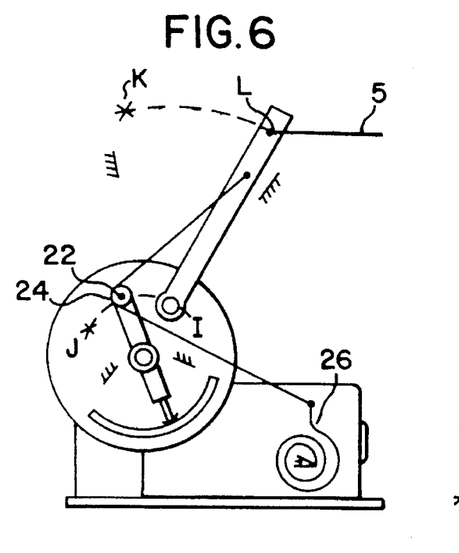
FIG. 6 shows a variant embodiment of the actuator.
Figure 7:
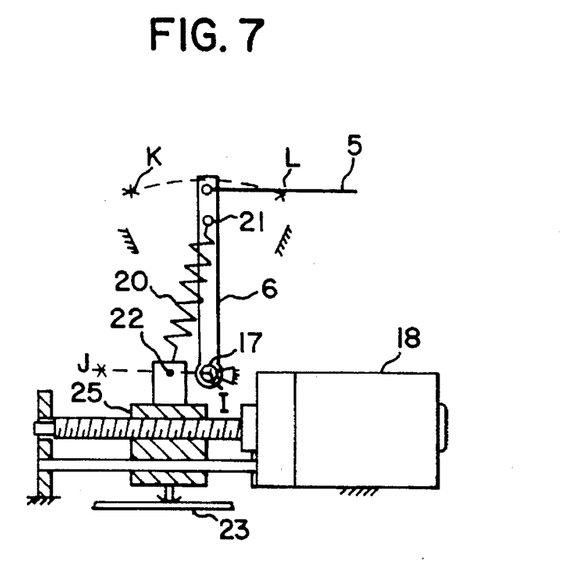
FIG. 7 shows a variant embodiment of the actuator.
Figure 8:
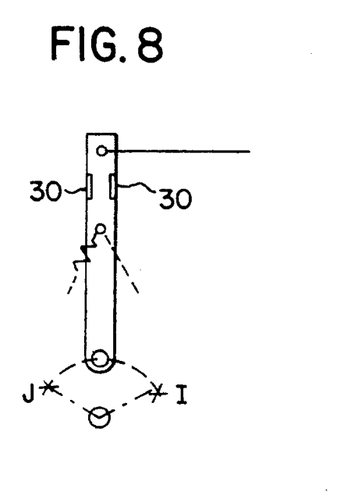
FIG. 8 shows a variant embodiment of the actuator.

In the mechanisms of FIGS. 3 and 4, the displacement of the lever (6) over the arc KL slightly influences the return force, without this being perceptible to the user. For other applications (robots, remote manipulators, assisted controls, etc.), better precision in the regulating of the force and greater independence with respect to the displacement of the output movement can be obtained by various means: modification of the relative movement of the rod and the lever, replacement of the tension spring by a multi-turn spiral spring (26) actuated by a cable, as shown as a variant (FIG. 6), and particularly by adding a closed loop control, by means of a direct measurement of the force. This measurement, transmitted to the electronic unit, can be effected by a known sensor interspersed between the lever of the output movement and the use, or by strain gauges (30) integral with the body of the lever (FIG. 8). This two-fold, open-loop/closed-loop control permits a precise and stable force control. For applications of this type, a bi-directional control of the force can be obtained by positioning the pin (17) between the positions I and J of the stroke of the pivot (22). Without going beyond the scope of the invention. The actuator can be developed in accordance with other variants which utilize the principle of control of the composition of the forces acting on the output member. FIG. 6 shows an embodiment in which the force is transmitted from the rod to the lever by a cable which is guided by a pulley which turns freely on the pivot (22). The position of the pulley with respect to the pin (17) of the lever determines the amplitude of the return force. This arrangement permits greater flexibility in the selection of the spring. Among other things, it permits the use of a multi-turn spiral spring the variation in hardness of which remains negligible with respect to the output movement. FIG. 7 diagrammatically shows another embodiment in which the pivot (22) is displaced in translation by a screw/nut system (25). For each of these embodiments, a variant construction consists in providing a small single-acting damper (29) connected to the lever (6) on the one hand and to the mechanical base on the other hand, so as to limit the speed of return of the lever and the impact of the pedal in the event that it should be suddenly released. Whatever the variant embodiment adopted, the actuator has good dynamic behavior with respect to displacements of the output movement. Rapid movements of the accelerator pedal do not produce any variation in force perceptible to the user, which contributes to an agreeable feeling of great flexibility. In fact, the return force depends only on the spring and not on the reactions of an actuator. Furthermore, with constant force, the energy expenditure is zero. The average intensity required for the operation therefore remains very moderate.

Figure 9:
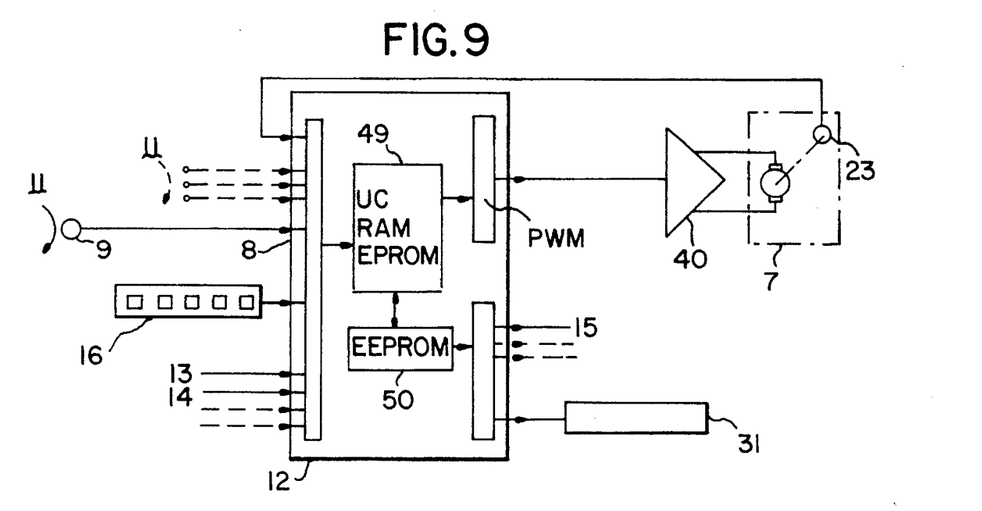
FIG. 9 is a block diagram of the electronic unit.

FIG. 9 diagrammatically shows the architecture of the electronic unit. It is developed around a single-chip microcontroller (49) interfaced in accordance with the directions of the manufacturer. It integrates the functions of acquisition, storage, and action calculations and assures the position control of the rod of the actuator via a power interface (40). In accordance with a variant embodiment, the power interface can also provide the position control function, in correspondence with the set value determined by the electronic unit and transmitted by the line (11). The speed measurement comes from a magnetic or optoelectronic sensor (9) which delivers a frequency proportional to the speed of rotation of the wheels. For the limiting of the traction slippage, it is necessary to provide one sensor per wheel. The set speed is selected by means of a small keyboard (16) read by the microcontroller. This may be a predefined value or the storage of the instantaneous speed. The electronic unit also reads on the lines (13) and (14) signals which are external to the system, safety set values or alarms, and controls by output lines (15) control devices of the vehicle. It also receives the signal controlled by the disengagement, by means, for instance, of a contact, and the signal by which the program determines the speed of displacement of the pedal. The different limiting and safety set points are stored in a memory which can rewritten and can be modified in situ very easily if necessary, among other things in order to keep in step with changes in the law, and they can also be locked. Briefly, the microcontroller carries out the following program:

acquisition of input values;

calculation of the actions related to the values monitored and to the set values;

processing of the alarms;

selection of the largest of the actions;

processing of the disengagement and acceleration signals;

output of the control and signaling signals.

The calculation of the cruising speed is effected in accordance with the algorithm known as proportional plus derivative action, with derivative of the measurement. The adjustments of the actions are selected in accordance with the rules of the art in order to obtain a control which is adapted to the behavior of the vehicle. They are optimized at all times as a function of the speed.

The control signal of the actuator, line (11), is formed of rectangular pulses modulated in cyclic ratio. These pulses control the power interface (40) formed by an "H" bridge of field effect power transistors which deliver the energy necessary for the control of the engine. The actuator sends, in return, towards the electronic unit the position information which is read by the microcontroller in order to assure the position control. The position sensor (23) may be of any known type. As example, there may be mentioned a potentiometer or a reflected binary coder of low resolution, as well as generator of pulses controlled by the rotation of the engine.

The microcontroller also manages the posting of the set value selected and the maintenance procedure for modifying the adjustment parameters.

Figure 13:
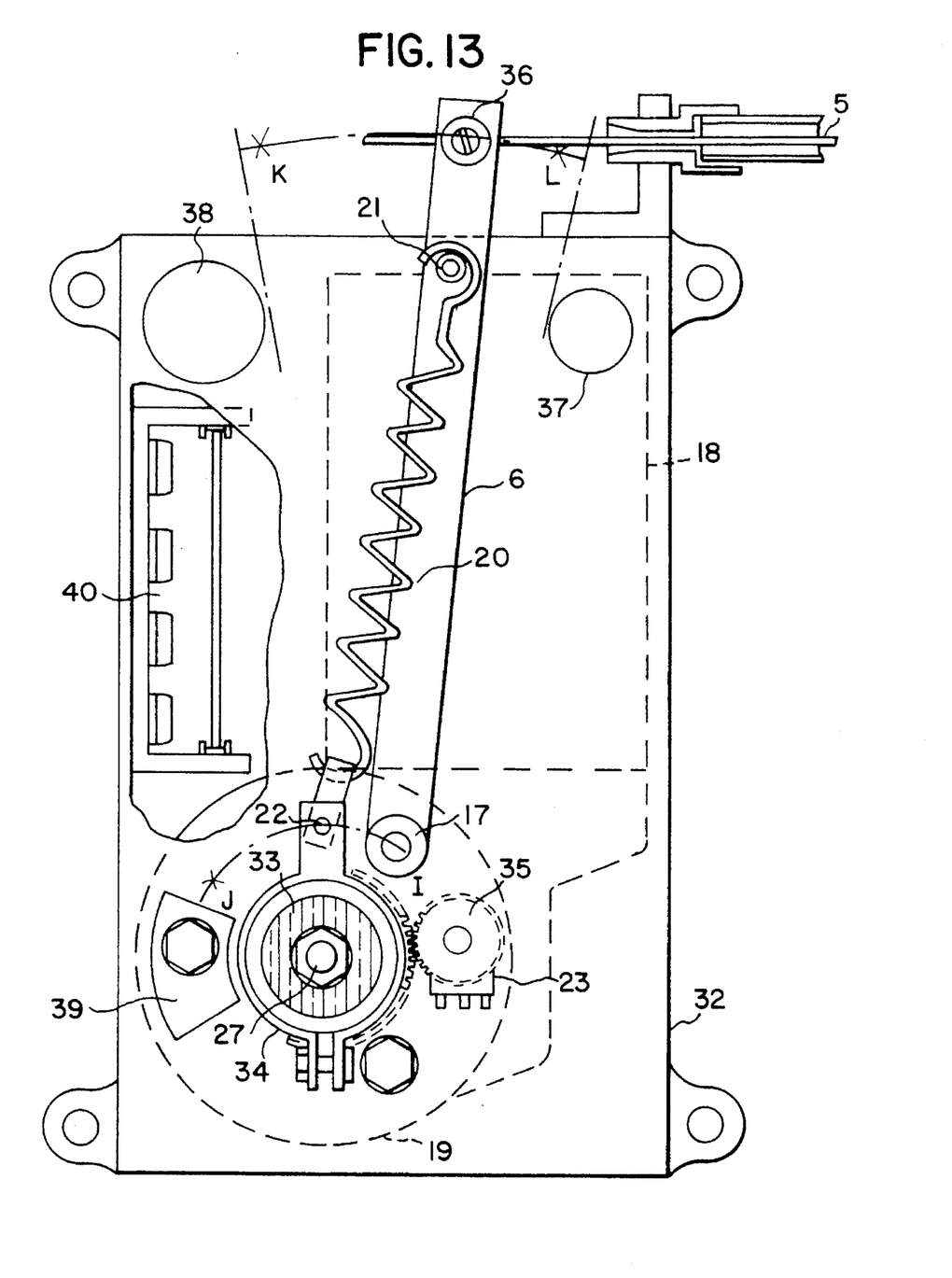
FIG. 13 shows a practical embodiment.

FIG. 13 shows a practical embodiment of the actuator. The geared motor combines in a monobloc assembly an electric motor (18) and a worm speed reducer (19). It is fastened in a housing (32) the upper face of which serves as mounting plate. The housing is provided with lugs to hold it, fixed in position, in the vehicle. The output shaft (27) of the speed reducer is equipped with a flexible coupling of the silent-bloc type (53), on the outer ring of which a collar is locked. This collar supports the pivot (22) to which the spring (20) is hooked. The shaft (27) also drives the copy potentiometer (23) in rotation via a pinion (35). The lever (6) of the output movement pivots on the pin (17), which is integral with the plate and the body of the actuator. It receives the traction of the spring via the pivot (21). At the end of the lever, a coupling piece (36), which is free in rotation, locks the end of the return cable (5), which, in its turn, is guided by a flexible sheath. The displacements of the lever are limited by two stops (37) (38), and the lever can act on the displacement sensor of the pedal, not shown in the figure. Stroke ends, not visible in the drawing, and a safety stop (39) limit the stroke of the pivot (22) in case of failure of the control. The power interface (40) is located in the housing. The entire mechanism is protected by a cover, the lever (6) of which extends out through a dust-shield joint.

Figures 10, 11, 12:
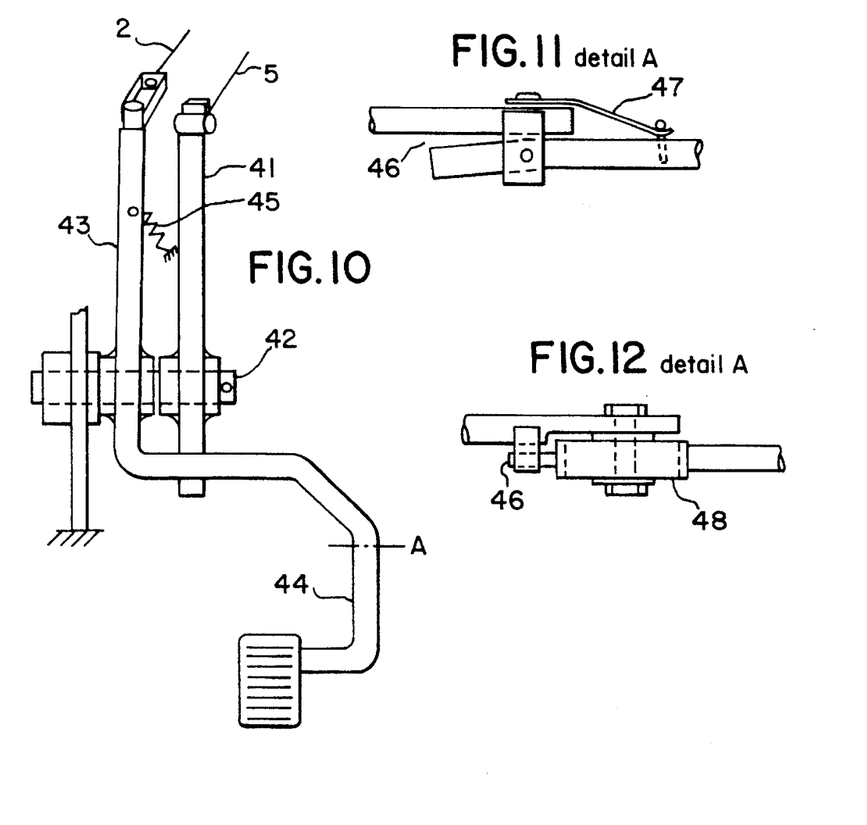
FIG. 10 shows a detail of the adaptation to the pedal.
FIG. 11 shows a variant detail of the pedal.
FIG. 12 shows a variant detail of the pedal.

FIG. 10 shows a possible embodiment of the return control for the pedal The cable (5) coming from the actuator actuates an intermediate lever (41) freely mounted on the pin (42). One end of this lever, parallel to the arm (43) of the pedal connected to the throttle valve, receives the cable head, while the other end exerts the force below the crank which the pedal forms. Pedal and lever are independent, so that the action of the lever can only raise the pedal again towards the position of zero power of the engine. It can neither increase the power nor oppose the natural rising of the pedal under the action of the return spring (45).

Any other means of mechanical connection which can act only in the direction of traction is also suitable—flexible cable, articulated rod, etc. The embodiment (FIG. 4) which consists in integrating the actuator in the pedal mechanism perfectly satisfies this condition.

FIGS. 11 and 12 show a variant embodiment in which the arm (44) which transmits the force to the foot of the driver is provided with a flexible connection of limited stroke, formed (FIG. 11) of an articulation and a spring (47), or (FIG. 12) of a silent-bloc (48) or of any other equivalent arrangement, such as a resilient pedal shoe. The stiffness of the flexible connection is selected much greater than the resisting force of the springs (4) and (45) which pull back the pedal, although it does not flex in normal use. When the limiter enters into action with sufficient force, a fraction of the maximum force, the flexure of the flexible connection permits the displacement of the arm of the pedal (44) even if the foot has not moved. This displacement is limited to a fraction of the maximum stroke by a stop (46). The force of reaction which the actuator exerts on the foot of the driver is not reduced, but the action of the cruise control on the control of the power of the engine is more efficient. This arrangement still leaves the driver the possibility of overriding the limitation, at the price of a slightly increased pedal stroke.

What is claimed is:

1. A power control assistance device for an engine having a power control member that is directly under operator control, said device comprising:

a control unit providing a control signal in response to signals provided to said control unit;

a speed sensor providing a speed signal to said control unit;

a set point selector providing a set point signal to said control unit; and an actuator mechanically connected to the power control member to provide a direct controlled return force to the power control member, in a direction opposite to the direction of force exerted by the operator, in response to said control signal.

2. The assistance device according to claim 1 wherein said actuator adjusts said return force from a minimum value to a maximum value without discontinuity, by displacement of the components of the forces exerted on the power control member by an output member (6) of the actuator (7).

3. The assistance device of claim 1 wherein the power control member is a pedal.

4. The assistance device according to claim 1 wherein said actuator comprises:

a lever;

a motor providing one-way movement of a given point in response to said control signal; and a spring connected between a point on said lever and said point displaced by said motor so as to provide a force in response to said control signal that opposes a force that is applied to the power control member by the operator to increase the power supplied by the engine.

5. The assistance device of claim 4 wherein said lever is an arm of a pedal and the spring extends between said lever and a rod, said rod being adapted to be driven by said motor.

6. The assistance device of claim 5, said device further comprising:

a pivot on said rod, said spring being connected to said pivot;

a one-way damper connected to said lever to reduce said movement of said pivot; and stops adapted to limit the stroke of said lever.

7. The assistance device of claim 6 wherein the position of said pivot on said rod is a function of a force set value determined by said control unit, and wherein movement of a pin on said lever is limited, so that said lever is adapted to selectably provide force in two directions.

8. The assistance device of claim 1 wherein the control unit provides said control signal to a motor through a power interface.

9. The assistance device of claim 7 wherein said force set value is the larger of:
   a) the difference between the speed measurement and a speed set value determined according to proportional-plus-derivative-action,
   b) the difference between the speed measurement and a control signal determined by other information,
   c) the difference between the speed measurement and a control signal determined by the disengagement of the clutch which temporarily forces the force set value to a low value when the speed of displacement of the power control member exceeds a given threshold.

10. The assistance device of claim 9 wherein said control unit is adapted to provide an alarm indication when said speed difference remains excessive.

11. The assistance device of claim 3 wherein said actuator is mechanically connected to said pedal by a cable freely connected to said pedal so as to act only in the direction in which it is pulled, without interfering with the natural return movement of the pedal.

12. The assistance device of claim 3 wherein said actuator is mechanically connected to said pedal by way of an intermediate lever so as to act on the pedal only in the direction of the reduction of engine power, without interfering with the natural return movement of the pedal.

13. The assistance device of claim 1 wherein said actuator further comprises a flexible connection of limited stroke between said actuator and the operator.

14. The assistance device of claim 1 wherein said flexible connection of limited stroke is a resilient pedal surface.

15. A power control assistance device having a power control member directly under operator control, said device comprising:
   an electronic unit providing a control signal in response to signals provided to it;
   a speed sensor providing a speed signal to the electronic unit;
   a set point selector providing a set point signal to the electronic unit; and
   a servo-motor mechanically linked to the power control member, said servo-motor providing a controlled direct return force in response to said control signal in a direction opposite to a force applied to the power control member by an operator.

16. The assistance device of claim 15 wherein said servo-motor adjusts said return from a minimum value to a maximum value without discontinuity.

17. The assistance device of claim 15 wherein said power control member is a pedal.

* * * * *